Patented Mar. 10, 1942

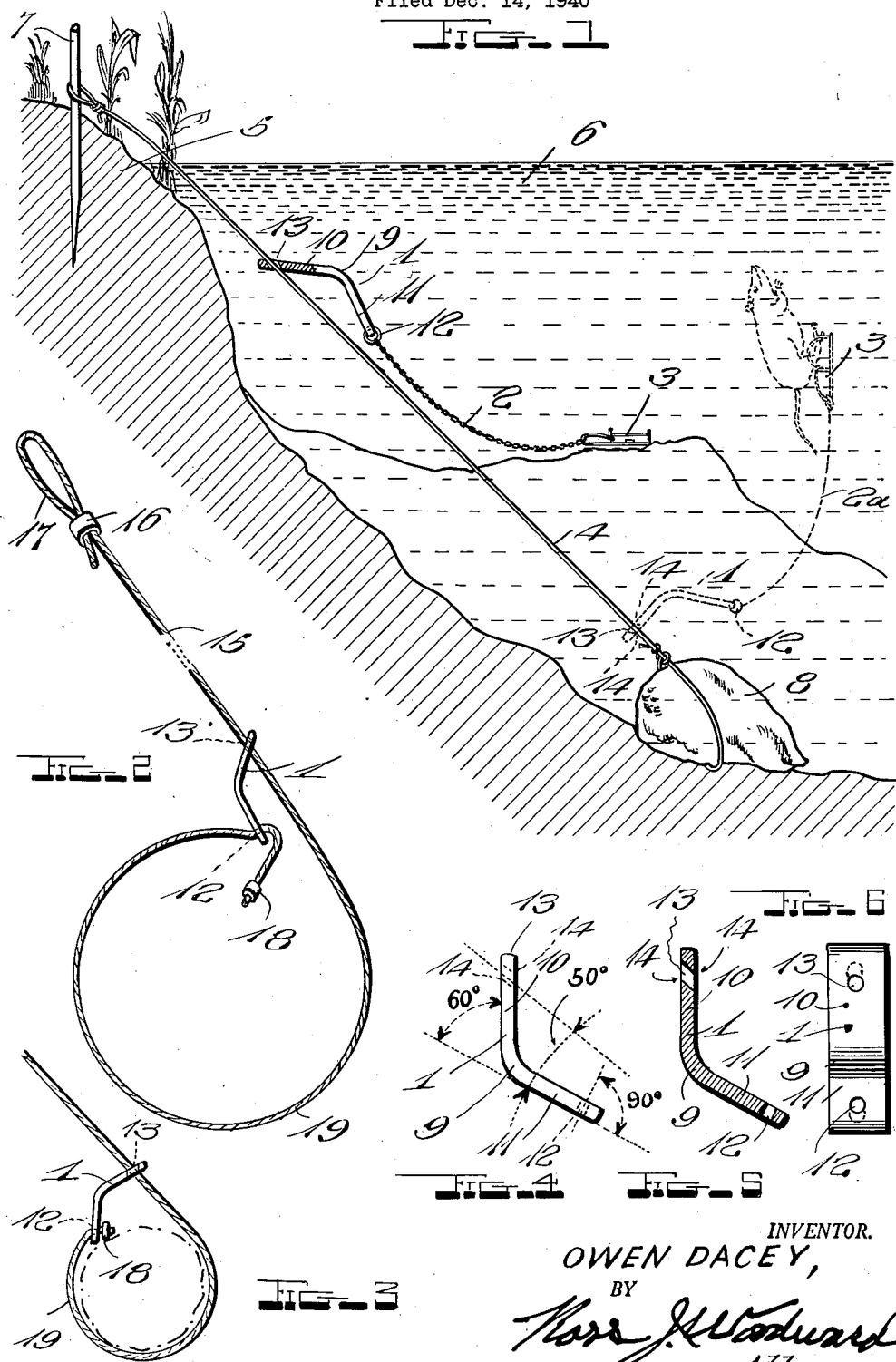

2,275,737

UNITED STATES PATENT OFFICE 2,275,737

TRAP

Owen Dacey, Warroad, Minn.

Application December 14, 1940, Serial No. 370,199

1 Claim. (Cl. 43—96)

This invention relates to traps and it is one object of the invention to provide a line and a slide member formed of metal and of such construction that while it may slide freely along the line in one direction, it will be prevented from readily sliding along the line in an opposite direction, due to the gripping engagement with the line. It will thus be seen that when a catch is made and the slide member or plate has slid along the line, the animal will be prevented from escaping after effecting sliding of the line toward its initial position.

The slide member or plate is particularly effective when used as a connection between a line and the anchor chain of a jaw trap used for catching muskrats and other water animals to prevent the animals from reaching the surface after diving into deep water when caught by a foot or leg in a jaw trap, and is also useful as a slide connection for the loop forming portion of a snare formed of flexible wire. It is to be understood, however, that use of the slide member or plate is not limited to use with the particular types of traps mentioned above.

The invention is illustrated in the accompanying drawing, wherein:

Fig. 1 is a view showing a jaw trap connected with a restraining line by a slide plate of the improved construction.

Fig. 2 is a perspective view of a snare consisting of a line having a slide plate of the improved construction associated therewith to form a noose.

Fig. 3 is a view showing the noose of Fig. 2, tightened.

Fig. 4 is a side elevation of the improved slide plate.

Fig. 5 is a sectional view taken longitudinally through the improved slide plate.

Fig. 6 is a view looking at the plate from the right of Figs. 4 and 5.

The improved slide plate 1 constituting the subject matter of this invention may constitute an element for connecting the anchoring chain 2 of a jaw trap 3 with a restraining line 4 which extends at an incline from the bank 5 of a body of water 6. Referring to Fig. 1, it will be seen that the upper or outer end of the restraining line is engaged with a stake 7 driven into the bank 5 and that the lower end of the line is secured about an anchor 8 which may be a large rock or any other type of anchor desired.

The slide member or plate 1 is formed of stiff metal and in the illustration consists of a metal strip which is preferably two inches long, one-half inch wide, and three-thirty-seconds of an inch thick but may be of any dimensions desired, according to the size of trap with which it is associated. The metal strip 1 is bent midway its length, as shown at 9, to form the plate with end portions 10 and 11 which extend at an obtuse angle to each other, as shown in Figs. 4 and 5. The end portion 11 is formed with an opening 12 to receive the ring 12 of the chain 2 and this opening is formed through the plate or strip at right angles thereto so that the ring may be easily engaged through the opening and turn freely therein. At its outer end, the plate or strip is formed with an opening 13 which extends at an incline longitudinally of the strip, as shown clearly in Figs. 4 and 5, so that when the plate is engaged with the restraining line 4, it may slide freely along the line toward the lower end thereof. This is clearly shown in Fig. 1, and referring to this figure, it will be seen that when the trap is placed in the water in the position shown in full lines, and a water animal steps upon the trap and becomes caught, the animal may dive to the bottom of the river or like without hindrance by the plate, which will slide freely toward the lower end of the straining line. However, when the animal attempts to swim to the surface of the water, the plate will be tilted upwardly to the position indicated by dotted lines in Fig. 1, and the sharp edges 14 at opposite side of the opposite ends of the opening 13 will have biting engagement with the line and cause the plate to be frictionally held against sliding movement upwardly along the line. It will thus be seen that the animal will be prevented from reaching the surface of the water and will quickly drown. Therefore, the trapped animal will be prevented from reaching the bank of the river or lake and biting or twisting its leg or foot loose from the trap. It will also be obvious that other animals will not be able to attack the trapped animal and damage its fur as the trapped animal will be under the surface of the water.

In Figs. 2 and 3 of the drawing, there has been shown a snare consisting of a line 15 formed of flexible wire. This line has one end portion folded back upon itself and secured by a threadless nut 16 to form a loop 17 by which the snare is secured to a tree, post or other fixed anchor. The line is threaded through the opening 13 of the slide plate 12 and carries a threadless nut 18 which prevents this end of the line from becoming disengaged from the plate. When this form of trap is in use, it is set in the usual manner with the loop in a runway in position to engage about the neck or a leg of an animal. When the animal is so caught, the loop will be tightened as shown in Fig. 3, and since the slide plate will be prevented from moving along the line in a direction to loosen the noose, the animal will be securely held and quickly strangled if the noose is about the animal's neck.

Having thus described the invention, what is claimed is:

In a trapping apparatus including a line for extending diagonally downwards from the bank of a body of water, and a jaw trap having an anchoring chain; a slide member for connecting the chain with the line consisting of a strip of stiff metal bent midway its length to form a line engaging portion and a chain engaging portion, said portions being disposed at an angle greater than 45° and each portion being straight throughout its length, the line engaging portion being formed with a line receiving opening extending diagonally through the strip at an incline longitudinally of the strip in converging relation to the outer end of the chain engaging portion whereby the strip may slide freely along the line towards the lower end of the line but have biting engagement with the line when an attempt is made to shift the trap and the strip upwardly along the line.

OWEN DACEY.